United States Patent [19]

Huang et al.

[11] Patent Number: 5,624,965
[45] Date of Patent: Apr. 29, 1997

[54] ARYLENEDIALKYLIDENE POLYMERS FOR HIGH PERFORMANCE ION EXCHANGE MEMBRANES

[75] Inventors: Jian-ping Huang, Morris Plains; Frederick P. Chlanda, Rockaway, both of N.J.

[73] Assignee: The Graver Company, Union, N.J.

[21] Appl. No.: 243,649

[22] Filed: Apr. 26, 1994

[51] Int. Cl.$^6$ .......................... B01D 71/68; B01D 71/76
[52] U.S. Cl. ............................................ 521/27; 521/33
[58] Field of Search ........................ 521/27, 33; 54/33; 528/534

[56] References Cited

U.S. PATENT DOCUMENTS

| | | | |
|---|---|---|---|
| 3,631,130 | 12/1971 | Klebe | 521/25 |
| 3,770,661 | 11/1973 | Fritz . | |
| 3,994,860 | 11/1976 | Brousse | 521/27 |
| 4,014,847 | 3/1977 | Lundberg et al. . | |
| 4,273,903 | 6/1981 | Rose | 525/534 |
| 4,714,725 | 12/1987 | Hendy et al. | 521/27 |
| 4,738,764 | 4/1988 | Chlanda et al. . | |
| 4,866,099 | 9/1989 | Hendy | 521/28 |

OTHER PUBLICATIONS

A. Fritz et al., "Synthesis of Aryleneisopropylidene Polymers", J. Pol. Science, Part A-1, 10, pp. 2365-2378, (1972).
R.E. Kesting, "Synthetic Polymeric Membranes", A Structural Perspective, 2nd. Ed., Wiley Interscience Publication, J. Wiley & Sons, (1985).

Primary Examiner—Peter F. Kulkosky
Attorney, Agent, or Firm—Keck, Mahin & Cate

[57] ABSTRACT

The present invention discloses permselective membranes comprising at least one layer formed from an arylenedialkylidene polymer at least a portion of which is sulfonated, said arylenedialkylidene polymer comprising recurring monomeric units as shown by the formula:

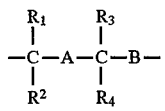

wherein $R_1$, $R_2$, $R_3$ and $R_4$ are alkyl having one to four carbon atoms; wherein A and B are different;

A is selected from the group consisting of

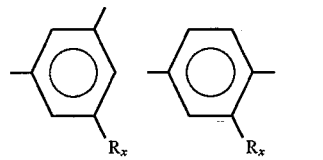

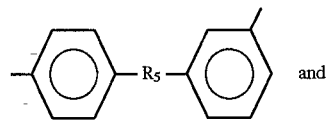 and

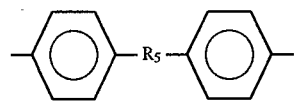

wherein $R_x$ is hydrogen or an alkyl having 1 to 4 carbon atoms, $R_5$ is alkylidene of 1–4 carbon atoms or oxyalkylene of 1–4 carbon atoms;

B is derived from the group consisting of benzene, naphthalene, thiophene, and aromatic compounds of the formula

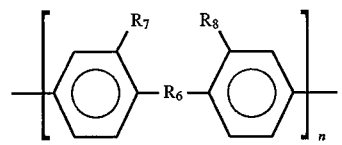

wherein $R_6$ is selected from the group consisting of alkylidene of 1–4 carbon atoms, oxyalkylene of 1–4 carbon atoms, —O—, —S—; $R_7$ and $R_8$ may be the same or different and may be H or methyl; and n is a number sufficient to provide a copolymer having a molecular weight sufficient to form a film. Processes for making said membranes and their use as ion exchange membranes are also disclosed.

12 Claims, No Drawings

ARYLENEDIALKYLIDENE POLYMERS FOR HIGH PERFORMANCE ION EXCHANGE MEMBRANES

BACKGROUND OF THE INVENTION

Polystyrene-based ion exchange materials such as sulfonated polystyrene have been widely used in electrodialysis for water purification, desalination, chemical purification and treatment of industrial wastes. However, due to the lack of chemical and oxidative stabilities these materials tend to lose mechanical strength in use, and operation temperature has to be limited to less than 40° C. Operation temperatures of 70° C. or higher are desirable to reduce operation cost. Increasing the operating temperature eliminates refrigeration necessary for cooling, and results in at least a 30% decrease in power consumption. This requires membranes that retain good transport performance at high temperature, have better mechanical properties and chemical stability. Improved membrane materials also reduce the need for membrane replacement and extend their service time.

Generally, it is simpler to use a commercial resin and convert it into ion exchange material by introduction of functional groups. The base polymer must be reactive to enable easy introduction of ionic functional groups, and soluble to allow membrane casting from solutions. It also must be mechanically tough, and oxidatively stable in use. Hydrolytic stability is also important for membranes to be used in electrodialytic water splitting processes, since they are usually exposed to high concentrations of acid or base for long times.

Most commercially available polymeric materials fail to fulfill these requirements. Styrene-based polymers have low oxidation resistance. Polyamides, polyimides and polyesters are prone to hydrolysis. Most fluorine-containing polymers are insoluble or difficult to functionalize. The same is true of polyethylene-like polymers. Although sulfonated polysulfone has excellent mechanical strength and oxidative stability, it lacks resistance to hydrolysis by strong base. Sulfonated polyphenyleneether has outstanding transport properties, but possesses even worse oxidative stability than styrene-based material. Thus, the commercially available resins all possess serious shortcomings.

Arylenediisopropylidene copolymers are known. U.S. Pat. No. 3,770,661, 1973 and A. Fritz and R. W. Rees, Journal of Polymer Science Part A-1, Vol. 10, pp. 2365–2378 (1972).

Electrodialysis cells having ion exchange membranes are known. Uses of such membranes in electrodialysis cells have been reviewed in *Synthetic Polymeric Membranes* by R. E. Kesting, McGraw-Hill Book Company, New York (1985).

DESCRIPTION OF THE INVENTION

The present invention relates to permselective membranes comprising at least one layer formed from an arylenedialkylidene polymer at least a portion of which is sulfonated, said arylenedialkylidene polymer comprising recurring monomeric units as shown by the formula:

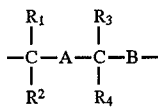

wherein $R_1$, $R_2$, $R_3$ and $R_4$ are alkyl having one to four carbon atoms, A and B are different;

A is selected from the group consisting of

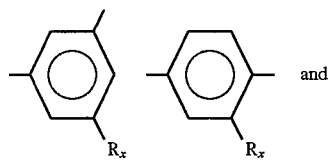
and
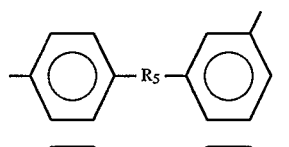

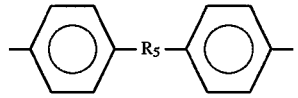

wherein $R_x$ is hydrogen or an alkyl having 1 to 4 carbon atoms, $R_5$ is alkylidene of 1–4 carbon atoms or oxyalkylene of 1–4 carbon atoms; B is derived from the group consisting of benzene, naphthalene, thiophene, and aromatic compounds of the formula:

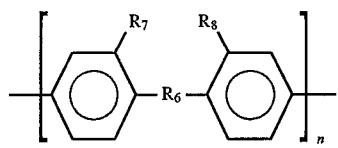

wherein $R_6$ is selected from the group consisting of alkylidene of 1–4 carbon atoms, oxyalkylene of 1–4 carbon atoms, —O—, —S—; $R_7$ and $R_8$ may be the same or different and may be H or methyl; and n is a number sufficient to provide a copolymer having a molecular weight sufficiently high to form a film.

The membranes of this invention exhibit good mechanical properties, improved oxidation resistance, high selectivity and base stability at up to 70° C.

The present invention further relates to a process for producing a branched, high molecular weight polymer comprising the steps of:

polymerizing para-bis(2-chloroisopropyl)benzene and diphenylether via condensation in the presence of a Friedel-Crafts catalyst and an excess of the dichloride to produce a polymerization mixture containing poly(phenyleneether diisopropylidenebenzene) and HCl;

removing the HCl generated via a vacuum;

diluting the polymerization mixture when the viscosity of polymerization mixture is between about 200 and about 600 cps.

Another aspect of this invention relates to an electrodialysis cell comprising the membrane of this invention.

Preferred for use in the practice of this invention are polyarylene ethers wherein:

A is a moiety of the formula:

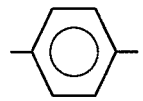

B is a moiety of the formula:

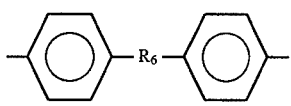

wherein $R_6$ is —O—; and
$R_1$, $R_2$, $R_3$ and $R_4$ are methyl.

In the most preferred embodiment of the invention, the layer will consist essentially of the partially sulfonated polyarylene ether. However, non-volatile additions, such as those employed to impart greater porosity to, or to improve the mechanical stability of, or to limit dimensional changes of the layer, may be included in the layer without departing from the scope of the invention. Such additions are generally known and include, but are not limited to pore-forming and reinforcement materials.

The precursor arylenedialkylidene can be prepared by conventional procedures, such as those described in U.S. Pat. No. 3,770,661, incorporated herein by reference. For example, arylenedisopropylidene copolymers are made by the condensation of 1,4-bis(2-chloro-isopropyl)benzene and diphenyleneether in the presence of a Friedel-Crafts catalyst.

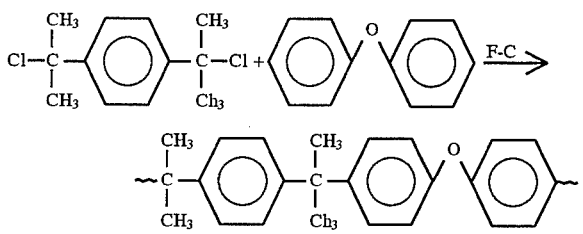

Although the ortho position of the diphenylether aromatic ring is also electronically activated, most of the alkylation early in the reaction takes place at the para positions because of the steric requirements of the bulky isopropylidene group. However, as the diphenylether monomer concentration decreases reactions with the ortho positions of the phenyl ether increase, causing chain branching. Excess chloride is needed to build high molecular weight polymers because chain branching consumes an extra chloride. Preferred equivalent ratios of the chloride to phenylether are between about 1 to about 1.2, the more preferred ratio are between about 1.02 to about 1.10 and the most preferred ratios are between about 1.03 to about 1.05.

Slow addition of the dichloride and rapid removal of HCl are important for the production of high molecular weight polymer. Accordingly, in the process of the present invention, HCl is preferably removed via vacuum stripping.

The resulting polymers have high molecular weight and polydispersity. The typical polydispersity, Mw/Mn, of this branched polymer is between about 20 to about 60. The reaction time is between about 1 to about 6 hours, preferably between about 1.5 to about 5 hours and more preferably between about 2 and about 4 hours. If branching is carried to an extreme, a cross-linked network will result causing gellation of the polymer. Dilution with solvent during the course of polymerization helps prevent gellation. However, premature dilution prevents the desirable increase in the molecular weight. Accordingly, dilution is begun when the viscosity of polymerization mixture is between 200 to 600 cps, more preferred viscosity is 300 to 500 cps and the most preferred 350 to 450 cps.

The molecular weight of the polymer must be sufficiently high to form a film. Moreover, higher molecular weights are preferred, as the resulting membranes display improved mechanical properties. One way to measure the molecular weight of the polymers of the present invention is via the inherent viscosity of the polymer. Generally, the inherent viscosity of the polymer is at least about 0.5 to about 1.2 dL/g as determined by capillary viscometry (o-dichloro benzene at 30° C.). Preferably the inherent viscosity is at least about 0.6 dL/g, more preferably from about 0.8 to about 1.2 dL/g and most preferably from about 1.0 to about 1.1 dL/g.

The arylenedialkylidene polymers which comprise the at least one layer are at least partially sulfonated. The degree of sulfonation determines the ion exchange capacity in the layer. In the present invention, the degree of sulfonation is controlled to yield an ion exchange capacity of between about 1.0 meq/g and about 2.0 meq/g, that is, 1 in 3 to 1 in 1 repeat units are sulfonated. In the arylene ether polymer, sulfonation is believed to occur primarily adjacent to oxygen substituted carbon atom. These cation exchange membranes exhibit an ion exchange capacity which is preferably between about 1.1 meq/g and about 1.6 meq/g, more preferably between about 1.2 meq/g and about 1.5 meq/g and most preferably between about 1.35 meq/g and about 1.45 meq/g.

The at least partially sulfonated arylenedialkylidene polymer is formed by sulfonation of the arylenedialkylidene polymer. The sulfonation is ordinarily carried out by reacting the arylenedialkylidene polymer with a material which will convert the arylenedialkylidene polymer to the sulfonic acid forms, but which will not cause any material amount of polymer degredation or crosslinking. The sulfonation reaction is generally carried out with reactants such as sulfuric acid, sulfur trioxide, chlorosulfonic acid, alkyl phosphate complexes of $SO_3$ or acyl sulfates. Other sulfonation reactants known in the art may be employed. Preferably, sulfuric acid and acetic anhydride are employed, as disclosed in U.S. Pat. No. 4,738,764. The arylenedialkylidene polymer is, most preferably, initially dissolved in a solvent, for example, dichloroethane, methylene chloride, dichlorobenzene, tetrachloroethylene or any other solvent which is inert to sulfonation thereof. The solvent is employed in an amount convenient to dissolve the constituents. Typically, the solvent is employed in an amount to yield an about 5 wt % to about 25 wt % solution. Thereafter, the sulfonating reagent is added under controlled conditions to sulfonate the reactants to the desired degree. With the preferred sulfonation reactants of the present invention, sulfonation is generally carried out at between about 40° C. and about 0° C. for a period of between about 5 to about 20 hours, to produce a degree of sulfonation of between about 1 in 3 and about 1 in 1 repeat units of arylenedialkylidene, which corresponds to an ion exchange capacity of between about 1.0 meq/g and about 2.0 meq/g.

As described above, the degree of sulfonation is controlled to produce a product which has an ion exchange capacity within the above noted ranges. The ion exchange capacity is controlled by such factors as the time and temperature of reaction, the ratio of sulfonation reactant to polymer, and the concentration of reactants. In the most preferred embodiment, sulfonation is carried out by reacting acetic anhydride and sulfuric acid with polyarylene ether. The acetic anhydride and sulfuric acid react to produce acetylsulfate which, in turn, reacts with the aryl groups to produce a sulfonated product. The expected reactions sequence is represented below:

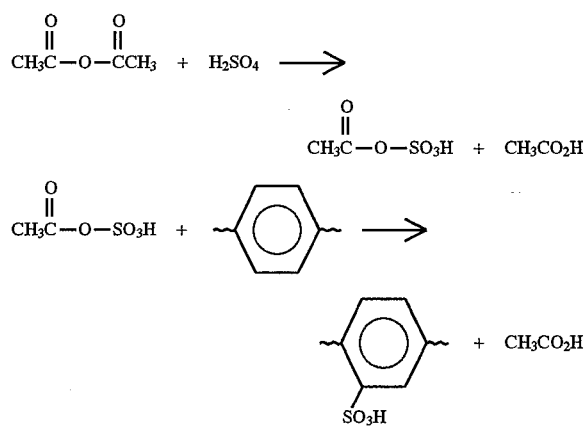

A ratio of acetic anhydride to $H_2SO_4$ of at least about 1:1 is required in order to avoid the presence of free $H_2SO_4$ which can lead to a crosslinking reaction. Most preferably, a small excess of anhydride is employed but a large excess can reduce yield and is not desirable.

The membranes of the present invention are prepared by forming a mixture comprising at least partially sulfonated arylenedialkylidene polymers in a solvent forming a layer comprising the above-described mixture, and thereafter evaporating solvent from the layer, the layer having a resistance of less than about 5 $\Omega$-cm$^2$ (in the annealed form) in dilute sodium sulfate solution and an ion exchange capacity of between about 1.0 meq/g and about 2.0 meq/g. Membranes may also be formed by the well-known techniques of extrusion or compression molding of a mixture of the above-described polymers. The method disclosed in the U.S. Pat. No. 4,014,847 may be especially useful in preparing mixtures of the materials for such molding processes.

The at least partially sulfonated product is dissolved in a suitable solvent and cast onto a substrate. The solvents useful in the present invention may be selected from alkyl alcohols, N-methylpyrrolidone, dimethyl sulfoxide, N,N-dimethylformamide and other known solvents for polar polymers. Most preferably, N,N-dimethylformamide (DMF) is used with the most preferred polymers. The amount of solvent employed varies depending upon the polymers selected, the molecular weight of the polymer, the solubility of the polymers in the solvent, and the desired thickness of the membrane to be formed. Generally, mixtures or solutions for forming cation exchange membranes have a concentration of between about 10% and about 40% (weight % of polymer). Although the polymer and the solvent most preferably exist as solution, the production of a homogeneous mixture is acceptable for casting membranes of the present invention.

The mixture or solution is then spread onto a substrate e.g. a glass plate or previously formed layer(s) of membrane, to a generally uniform thickness. The thickness of the mixture is variable depending on such factors as the concentration of polymer in the mixture and the desired thickness of the layer. Ordinarily, cation membranes will be cast to a final thickness of between about 3 mils and about 10 mils by forming an initial layer of a thickness of between about 15 mils and about 30 mils. Reinforcing material may also be added.

After being spread to a general uniform thickness, the solvent is evaporated from the mixture. This step is ordinarly accomplished by placing the mixture in an oven. Generally, the temperature in the oven will be about 25° to about 50° C. less than the boiling point of the solvent to avoid forming bubbles in the layer. For example, when DMF is used as the solvent, the temperature in the oven will, ordinarily, range from between about 100° C. to about 130° C. and the time at temperature will range from about 10 minutes to about 30 minutes to substantially completely dry the layer. Thereafter, the layer is cooled and the membrane is removed from the substrate. When glass plates are employed as a substrate, the membranes are usually soaked free of the plate in deionized water or a salt solution.

We have also determined that annealing the membranes subsequent to removal from the plate increases the long-term stability of the electrical properties of the membranes. The annealing step consists of heating the membranes at a temperature between about 40° C. and about 100° C. in a moderately concentrated salt solution (typically 1M NaCl or 0.5M $Na_2SO_4$) for a period of about 0.5 to about 2 hours. In the most preferred embodiment, the annealing step is carried out by heating the membrane at 100° C. in 1.0M NaCl for about 20 minutes. Use of potassium or other salts for the annealing step may also be advantageous. Membranes which have not been annealed may initially exhibit superior electrical properties but the properties degrade in use or on storage over relatively short terms.

The relationship between membrane efficiency as measured by current efficiency in a transport experiment and resistance is known. Generally, as resistance increases, current efficiency increases. The higher the resistance, the more power is consumed in the process of transporting ions across the membrane. In contrast, membranes within the scope of the present invention exhibit high current efficiency at a low resistance. Typically, the membrane resistance is less than about 6 $\Omega$-cm$^2$. The current efficiency of the membrane at this resistance level is about 90% in 15 wt. % NaOH. Ordinarily, membrane resistance at room temperature is between about 2 $\Omega$-cm$^2$ and about 10 $\Omega$-cm$^2$, preferably is between about 2 $\Omega$-cm$^2$ and about 5 $\Omega$-cm$^2$, and most preferably is between about 2.5 $\Omega$-cm$^2$ and about 4 $\Omega$-cm$^2$. In the range of 2 $\Omega$-cm$^2$ to 10 $\Omega$-cm$^2$, the membrane exhibits a current efficiency of between about 75% and about 95%. In the range of 2 $\Omega$-cm$^2$ to 5 $\Omega$-cm$^2$, the current efficiency is between about 75% and about 86%, and in the range of about 2.5 $\Omega$-cm$^2$ to about 4 $\Omega$-cm$^2$ the current efficiency is between about 78% and about 82%. Most preferably, the membranes exhibit a resistance of less than 4 $\Omega$-cm$^2$ and a current efficiency of at least about 80%.

The current efficiency of the membrane of this invention is generally equal to or greater than about 70%, preferably equal to or greater than about 75%, more preferably equal to or greater than about 80% and most preferably from about 78% to about 85%, as determined by $OH^-$ transport through the membrane.

All of the above-described values of resistance and efficiency are values for membranes which are annealed after formation by the procedure described hereinbelow.

The sulfonated polymers of the present invention may be used alone as a cation exchange material, or may be used as the cation layer of a bipolar membrane. In addition to being useful after sulfonation as cation exchange materials, methylated derivatives of the polyaryleneether (ie. those in which either $R_7$ and/or $R_8$ are methyl groups) may also be converted to alkyl halides which can be reacted with amines to give useful anion exchange materials.

The membranes of this invention can be used for those purposes for which conventional ion exchange membranes are used and are especially suitable for use in electrodialysis cells of the type having alternating cation, anion and/or bipolar membranes. The membranes of this invention are especially useful in electrodialysis cells being operated at 65° C. or higher temperature because they retain their excellent transport properties and mechanical strength at about 70° C., and are stable in base at relative high temperatures i.e. 85° C. such that such cells can operate at such temperatures where they are more effective.

The following specific examples are presented to more particularly illustrate the invention and are not to be construed as limitations thereon.

EXAMPLE 1

Dichloride monomer was prepared by the following procedure. A 2 liter, 3-necked round bottom flask fitted with a mechanical stirrer was charged with 800 ml of 37% HCl and 900 ml of hexanes. Powder of 160 g of 1,4-bis(2-hydroxyisopropyl)benzene (p-BHIPB) was gradually added with vigorous stirring at room temperature. The mixture appeared to have two phases: an organic layer (top) and an aqueous layer (bottom). The top layer was isolated with a separatory funnel and collected in a round bottom flask, then stirred with 30 g of anhydrous $MgSO_4$. The mixture was filtered and placed in refrigerator (0°–5° C.) overnight. Crystals of 1,4-bis(2-chloroisopropyl)benzene (p-BCIPB) that formed were collected after decanting the supernatant and dried under vacuum on the rotary evaporator at 25° C. for about 2 hours. The solids were then transferred to a wide mouth jar and placed in a vacuum oven at 25° C. and 3–10 mm Hg for 20 hours. The 150 g of dichloride product was stored under nitrogen at 0°–5° C.

EXAMPLE 2

Poly(phenyleneether diisopropylidenebenzene) (PD) was produced by the following procedure using gas flow to strip HCl byproduct. A dry 300 ml, 4-necked round bottom flask was assembled under nitrogen together with a mechanical stirrer equipped with a torque indicator, thermometer, a fritted glass gas inlet, gas outlet and a septum-capped neck. The flask was charged with 21.28 g (0.125 mole) of diphenylether, 110 ml of dry methylene chloride ($CH_2Cl_2$) and 1.24 g (0.00375 mole) of triphenylmethyl tetrafluoroborate ($Ph_3CBF_4$). The mixture was stirred at room temperature, forming a clear, orange-red solution. The solution was cooled to −23° C. in an isopropanol/dry ice bath.

To a separate 50 ml heart-shaped flask were charged 3.6 ml (0.0625 mole) of nitromethane, 5 ml of $CH_2Cl_2$ and 1.67 g (0.0125 mole) of anhydrous $AlCl_3$. The flask was gently stirred until a clear, yellowish solution formed.

The $AlCl_3$ solution was injected slowly with a 20 ml syringe through the septum into the stirred reaction solution at −23° C. A dark-colored solution formed that was stirred for 10 minutes. Then 29.90 g (0.129 mole) of p-BCIPB dissolved in 20 ml of $CH_2Cl_2$ was slowly injected into the flask. At this moment the reaction solution contained 19–20 wt % of added reagents. To sweep away HCl byproduct, a nitrogen flow at 700–800 ml/min. was introduced immediately to the reaction solution via a fritted-glass bubbler. The evolved HCl was collected in a base scrubber before $N_2$ was vented to the hood. After 1 hour of reaction, $CH_2Cl_2$ was gradually added to the solution to limit the viscosity. The reaction was continued for 2.5 hours at −22° to −25° C., while the viscosity increase was monitored by the torque readings. A total of 110 ml $CH_2Cl_2$ was added to the reaction solution. At the end of the reaction, 1.5 g of diphenylether was added to cap the polymer chain ends. This was followed 10 minutes later by 2 cc of methanol in 20 ml of $CH_2Cl_2$.

The polymer solution was diluted further to 3–5 wt % of solids, then poured slowly into 3 liters of methanol with vigorous stirring. The precipitated polymer (fibrous appearance) was washed twice with 500 ml of methanol and then vacuum-dried at 80° C. overnight. Inherent viscosity (IV) of the polymer was 0.89 dl/g measured in o-dichlorobenzene at 30.0° C. with a size 50 Ubbelohde viscometer.

EXAMPLE 3

The purified PD resin prepared in Example 2 was sulfonated as follows. Purified PD resin (6.6 g, 0.02 mole) was dissolved in 65 ml of methylene chloride in a 100 ml, 3-necked round bottom flask equipped with magnetic stirrer, condenser and thermometer. The flask was immersed in a 40° C. oil bath. Acetic anhydride (3 g) was added dropwise to the polymer solution under nitrogen with rapid stirring. Then concentrated sulfuric acid (96%, 1.7 g) was added dropwise to the reaction mixture. The reaction was kept at 40° C. for 15 hours. The reaction was stopped by cooling the mixture to 10° C., then adding 12 ml of methanol. Sulfonated PD polymer (SPD) was recovered by spreading the viscous mixture in an evaporation dish, then evaporating methylene chloride in a convection oven. Dried SPD polymer was cut into smaller pieces, stirred in deionized water and dried. The sulfonated PD hd an ion exchange capacity of 1.54 meq/g. The sulfonation yield was 80%.

EXAMPLE 4

The sulfonation of PD resin can be carried without isolation of purified polymer. A PD solution of 950 ml, containing about 114 g (0.354 mole) of PD polymer prepared in the manner of Example 1, was transferred to a 2000 ml, 4-necked, round bottom flask, equipped with a mechanical stirrer, thermometer, reflux condenser and a 50 ml addition funnel. Fresh $CH_2Cl_2$ (300 ml) was added to the flask so that the solution was diluted from about 9.5 wt % to 7 wt % solids. The flask was immersed in a 40° C. oil bath. When the solution temperature reached equilibrium, 45.5 g of acetic anhydride was added slowly to avoid precipitation. 31 g of concentrated $H_2SO_4$ (96%) was then slowly introduced into the reaction. The solution turned orange, and the solvent reflux became more vigorous, indicating an exothermic process. After 21 hours at 36°–40° C., the reaction was cooled to 10° C. in an ice bath, and terminated by adding 20 ml of methanol. The reaction solution containing about 129 g of PD polymer was transferred into a 2 liter, one-necked round bottom flask.

DMF (300 ml) was added to the flask. $CH_2Cl_2$ was removed with a rotary evaporator. During evaporation about 280 ml more DMF was added into the flask. About 700 ml of clear solution was obtained (20 wt % of PD in DMF).

This SPD solution was diluted with additional 1100 ml of DMF to about 8 wt % (a total volume of 1800 ml), which was easily filtered through a filter paper to remove insoluble impurities and some polymer gels, then precipitated into 10 liters of 20 wt % NaCl with vigorous stirring, giving solid, white polymer fibers, which were repeatedly washed with deionized water until the conductivity of the wash was below $10^{-3}$S/cm. The polymer was drained, then vacuum-dried at 120° C. for 20 hours. The purified SPD (113 g) had an ion exchange capacity of 1.41 meq/g. The SPD polymer recovery was 87%.

EXAMPLE 5

PD polymer can be made using vacuum stripping to remove the HCl byproduct. A 500 ml 4-necked round bottomed flask, dried overnight in a 130° C. oven, was assembled under nitrogen with a mechanical stirrer, thermometer, 125 ml dropping funnel and 1 liter dry ice cooled condenser. The outlet of the condenser was connected to a 250 ml gas washing bottle containing 100 ml of 98% $H_2SO_4$ (to prevent moisture from entering the reaction) and then to an empty vacuum trap. The trap was connected to an aspirator (Cole-Parmer, Model 7049-00). A mixture of water, NaOH and NaCl was charged to the water tank of the aspirator. To achieve the needed vacuum, the water was kept at 0° to 5° C. by constantly adding ice.

Under nitrogen, 27.23 g of diphenylether (0.16 mole scale), 1.58 g of $Ph_3CBF_4$, 150 ml of anhydrous methylene chloride were added into the flask. With gentle stirring, this mixture formed a clear, orange solution. A preformed catalyst solution, containing 2.35 g of $AlCl_3$, 4.5 ml of $CH_3NO_2$ and 5 ml of $CH_2Cl_2$, was slowly injected into the solution cooled to $-25°$ C. Then 38.46 g of p-BCIPB crystals (0.1664 mole) and 40 ml of anhydrous methylene chloride were charged to the dropping funnel which was gently shaken until a clear, colorless solution was formed. An isopropanol/dry ice mixture kept at $-50°$ C. was placed in the condenser to prevent solvent evaporation.

The dichloride solution was slowly added over a period of 25 minutes at $-26°$ C. and 30 mmHg. The vacuum caused methylene chloride to boil vigorously and reflux. The solvent reflux allowed effective removal of HCl, which was readily absorbed in the basic medium of the aspirator. After about 2 hours, 210 ml of fresh methylene chloride was slowly added to the mixture, and vacuum was gradually increased from 30 mmHg to 15 mmHg while the reaction mixture temperature decreased from $-26°$ C. to $-34°$ C. A rapid increase in viscosity was observed. The polymerization was terminated by adding 3 ml of methanol in 30 ml of methylene chloride. The resulting polymer had an IV 0.88 dl/g.

EXAMPLE 6

Membranes can be case by the following procedure. In a 50 ml beaker were added 4 g of SPD polymer (capacity 1.3 meq/g), 15.6 g of DMF, and 0.4 g of surfactant solution in DMF (0.2g of 3M Fluorad FC-430 per gram of solution). The mixture was stirred until a uniform solution formed. The solution was passed through a piece of fabric to remove particulates, then poured on a glass plate and spread to a uniform thickness by a doctor blade set to a gap of 35 mils. The glass plate with cast solution was placed in a forced draft oven at 125° C. for 20 minutes. After cooling, the membrane was soaked free of the plate in water, then conditioned in boiling 1N NaCl for 25 minutes and stored in deionized water. The cast membranes had an average thickness of 4 to 6 mil.

EXAMPLE 7

Current efficiency of cation membranes was determined as follows. A 4-compartment cell, consisting of a cation membrane (TEST), interposed between two Nafion 110 cation exchange membranes, placed between electrodes was used to measure current efficiency of the cation membranes produced according to Example 6. One liter of 0.5M $Na_2SO_4$ was circulated to the anode rinse compartment and the cathode rinse compartment. Solutions of 150 ml of 1M NaCl and 300 ml of 15% NaOH were circulated in the salt compartment and in the base compartment respectively. The rate of transport of $OH^-$ from the base to the salt was determined by adding a measured amount of HCl to the salt while recording the time needed for the acid to be neutralized as determined with a pH meter. The current efficiency of the cation membrane for sodium ion transport at 15% NaOH is given by:

$$Eff.(\%) = \frac{[1 - 96.5 \times meq \text{ HCl added}]}{i(A) \times t(sec)} \times 100\%$$

where t is the time interval in seconds to neutralize the acid added to the salt compartment. Measurements were conducted at room temperature at 1.2 A (100 A/ft$^2$).

EXAMPLE 8

A 4-compartment cell as described above was used to measure resistance of cation membranes prepared according to Example 6. The exposed area of membrane was 11 cm$^2$. Separate solutions of 0.5M $Na_2SO_4$ were pumped through the cell for the electrode rinse and through the compartments adjacent to the membrane. The voltages were determined using small Ag/AgCl electrodes on either side of the TEST membrane position at several current levels (0.1–1.1 A) for the cell with and without TEST membrane. The ohmic resistance of the solution and that of the solution plus membrane can be obtained by calculating the slope of voltage vs. current. The difference between the two resistances is the membrane resistance. The areal resistance was calculated by:

$$A.\ R.\ (\Omega\text{-}cm^2) = (R_{M+S} - R_S) \times 11\ cm^2$$

EXAMPLE 9

Examples 7 and 8 were repeated with solutions heated to various temperatures to measure the current efficiency and resistance of membranes made according to Example 6 as a function of temperature. The solution containers were insulated with insulating tapes and the solutions were heated to the desired temperatures which were regulated with proportional temperature controllers. Table 1 shows the results.

TABLE 1

| High Temperature Performance of SPD Membranes | | | | | |
|---|---|---|---|---|---|
| Temp. (°C.) | 30 | 40 | 50 | 60 | 70 |
| Resistance ($\Omega$ - cm$^2$) | 4.0 | 3.0 | 2.3 | 1.7 | 1.5 |
| Efficiency (%) | 86 | 86 | 87 | 87 | 87 |

Little change in dimension occured between 30° C. and 70° C. and the membranes remained strong at the highest temperatures measured. The membranes of the present invention exhibit a decrease in resistance while maintaining a high current efficiency even at temperatures up to 70° C. As the energy requirements of the cell are directly proportional to the resistance, the membranes of the present invention result in an energy saving.

EXAMPLE 10

The oxidative stability of the membranes made according to the present invention was compared to that of other cation membranes. A potassium dichromate solution was prepared by dissolving 7.4 g of $K_2Cr_2O_7$ crystals in 0.5N $H_2SO_4$ to make 250 ml solution. A 1 in$^2$ sample of each of the membranes tested was immersed in 50 ml of the dichromate solution and placed in a 70° C. convection oven. Flexibility of the aged film was qualitatively examined at desired time intervals. The time for the first noticeable change (onset) and the additional time to become very brittle (duration) are noted in Table 2.

TABLE 2

Oxidation Stability of Cation Membranes

| Cation Membrane | Onset (hr) | Duration (hr) |
| --- | --- | --- |
| sulfonated poly (phenyleneether) | 1.5 | 1.0 |
| sulfonated polystyrene | 2 | 12.5 |
| Example 6 | 9 | 25 |
| sulfonated polysulfone | 24 | 56 |

It is clear that the membranes of the present invention are much more oxidatively stable than either sulfonated polyphenlyene-ether or sulfonated polystyrene.

EXAMPLE 11

In order to quantify the base resistance of the membranes, membranes made according to Example 6 were soaked in 25% NaOH solution at 85° C. The membrane's strength and flexibility were checked at desired time intervals qualitatively and chemical stability was examined by elemental analysis. The electrodialytic stability was evaluated by reconditioning the membranes in boiling 1N NaCl, then measuring areal resistance and current efficiency. The results are shown in Table 3, below.

TABLE 3

| Time (day) | Base Resistance | | | |
| --- | --- | --- | --- | --- |
| | 0 | 39 | 65 | 107 |
| A.R. ($\Omega$ - cm$^2$) | 4.2 | 4.3 | 3.6 | 3.6 |
| Eff. (%) | 86 | 83 | 83 | 86 |

After 107 days, the membranes were still mechanicaly strong. The elemental analysis showed no change in chemical composition.

EXAMPLE 12

The mechanical properties of membranes produced according to Example 6 and a commercial sulfonated polystyrene cation membrane (Comp.) were analyzed using an Instron Universal testing machine. The membranes tested were water saturated, as that is their condition in use. Tensile strength is the force required to tear the membrane at a uniform, specified rate. Fracture toughness is force required to tear a notched membrane at a uniform, specified rate. Elongation is the measure of extension of the sample before breakage. The results are listed in Table 4, below.

TABLE 4

| | Mechanical Properties | | |
| --- | --- | --- | --- |
| Sample | Tensile Strength (psi) | Fracture Toughness (ksi.in$^{1/2}$) | Elongation (%) |
| 1 | 6,000 | 6.5 | 11 |
| 2 | 5,600 | 6.6 | 13 |
| 3 | 5,200 | 7.2 | 6 |
| COMP. | 1,800 | 2.8 | 4 |

The membranes of the present invention display mechanical properties which are two to three times greater than that of the commerically available membrane tested.

EXAMPLE 13

Methylated polyarylene ether was prepared as follows. A well dried, 300 ml, 4-necked round bottom flask was assembled under nitrogen together with a mechanical stirrer, thermometer, $N_2$ bubbler, gas outlet and a septum-capped neck. To the flask were charged 20.26 g (0.11 mole) of o-methylated diphenylether prepared according to U.S. Pat. No. 4,564,712, 110 ml of methylene chloride and 1.09 g (0.0033 mole) of triphenylmethyl tetrafluoroborate. The mixture was stirred at room temperature, forming a clear, orange-red solution. The solution was cooled to –23° C.

To a separate 50 ml heart-shaped flask were charged 3 ml (0.055 mole) of nitromethane, 5 ml of $CH_2Cl_2$ and 1.5 g (0.011 mole) of $AlCl_3$, anhydrous. The flask was gently stirred until a clear, yellowish solution formed.

The above $AlCl_3$ solution was injected slowly with a 10 ml syringe through the septum into the stirred reaction solution cooled to –23° C. The resulting dark-colored solution was stirred for 10 minutes. Then 26.31 g (0.114 mole) of 1,4-bis(2-chloroisopropyl)benzene (p-BCIPB) dissolved in 30 ml of $CH_2Cl_2$ was slowly poured into the flask. A nitrogen flow of 700–800 ml/min was started immediately through a glass fritted bubbler. The evolved HCl was collected in a base scrubber before $N_2$ was vented to the hood. After 1.5 hours the reaction mixture was diluted with 90 ml of methylene chloride. The reaction was terminated after two hours by adding 0.5 ml of o-MDPE to cap the unreacted 2-chloro-2-propyl groups. This was followed by adding 5 ml of methanol to deactivate aluminum trichloride. The above mixture (300 ml) was diluted with $CH_2Cl_2$ to 950 ml (2 wt % of solids), then filtered through a coarse filter paper into 4L of methanol with vigorous stirring, forming white, solid fibrils. Vacuum drying at 80° C. overnight yielded 24.5 g of MPD. Inherent viscosity of the polymer, measured in o-dichlorobenzene at 30.0° C. with a size 50 Ubbelohde viscometer, was 0.98 dL/g.

EXAMPLE 14

In a 200 ml 3-necked round bottomed flask were charged 6.0 g of purified MPD and 70 ml of methylene chloride. The mixture was stirred at room temperature until a clear MPD solution formed. At 40° C., 1.8 g of acetic anhydride was slowly added to the polymer solution, followed by a dropwise addition of 1.2 g of 96% $H_2SO_4$. It was kept at 38°–40° C. for 15 hours. The reaction was terminated by adding 2 ml of methanol at 25° C. Methylene chloride was removed by evaporation in a convection oven at 55° C. for 30 minutes. Water soluble impurities in the polymer were leached out by stirring SMPD pieces in fresh deionized water. The resulting SMPD had an ion exchange capacity of 1.38 meq/g. Sulfonation yield was 80%.

EXAMPLE 15

The SMPD resin was readily dissolved in DMF. Its membrane was prepared by casting 20 wt % solution in DMF with 0.2 wt % of surfactant (3M Fluorad FC-430) on a glass plate, followed by solvent evaporation in a convection oven at 125° C. for 25 minutes. Membrane was removed from glass plate by soaking it in cold water. Membrane areal resistance in 0.5N $H_2SO_4$ was 4.0$\Omega$ cm$^2$ (3.5 mil) and current efficiency in 15% NaOH was 86%.

What is claimed is:

1. A permselective membrane comprising at least one layer having a final thickness of about 3–10 mils formed from an arylenedialkylidene polymer at least a portion of which is sulfonated, said arylenedialkylidene polymer comprising recurring monomeric units as shown by the formula:

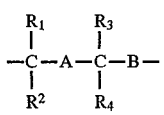

wherein $R_1$, $R_2$, $R_3$ and $R_4$ are alkyl having one to four carbon atoms; wherein A and B are different;

A is selected from the group consisting of

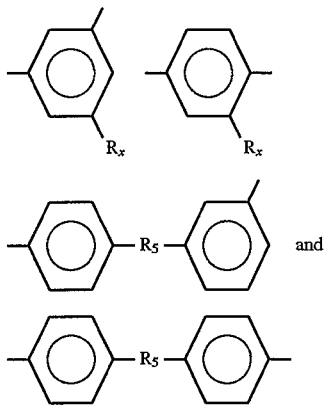

and wherein $R_x$ is hydrogen or an alkyl having 1 to 4 carbon atoms, $R_5$ is alkylidene of 1–4 carbon atoms or oxyalkylene of 1–4 carbon atoms;

B is derived from the group consisting of benzene, naphthalene, thiophene, and aromatic compounds of the formula

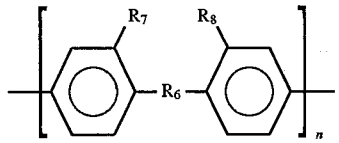

wherein $R_6$ is selected from the group consisting of alkylidene of 1–4 carbon atoms, oxyalkylene of 1–4 carbon atoms, —O—, —S—; $R_7$ and $R_8$ may be the same or different and may be H or methyl; n is a number sufficient to provide copolymer having a molecular weight sufficient to form a film, and to impart an inherent viscosity of at least about 0.5 to about 1.2 dL/g in o-dichlorobenzene at 30° C.; and wherein said membrane is a cation selective membrane having an ion exchange capacity of between about 1.0 meq/g and about 2.0 meq/g.

2. The permselective membrane of claim 1 wherein A is:

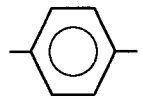

B is a moiety of the formula:

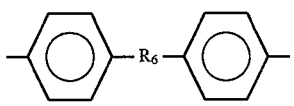

wherein $R_6$ is —O—; and $R_1$, $R_2$, $R_3$ and $R_4$ are methyl.

3. The permselective membrane of claim 1 wherein said arylenedialkylidene polymer has a polydispersity of between about 20 to about 60.

4. The permselective membrane of claim 1 wherein said inherent viscosity is between about 0.8 to about 1.2 dL/g.

5. The permselective membrane of claim 4 wherein said inherent viscosity is between about 1.0 to about 1.1 dL/g.

6. The permselective membrane of claim 1 wherein said ion exchange capacity is between about 1.1 meq/g and about 1.6 meq/g.

7. The permselective membrane of claim 1 wherein said ion exchange capacity is between about 1.3D meq/g and about 1.45 meq/g.

8. The permselective membrane of claim 1 wherein between about 1 in 3 and about 1 in 1 repeat units of polyarylene ether are sulfonated.

9. The permselective membrane of claim 1 wherein said membrane is annealed.

10. The permselective membrane of claim 1 wherein said membrane retains its efficiency at temperatures greater than 70° C.

11. The permselective membrane of claim 1 wherein A is:

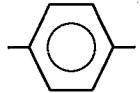

B is a moiety of the formula:

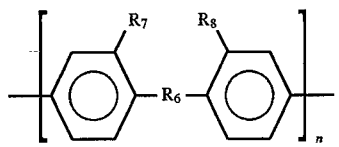

wherein $R_6$ is —O—; and $R_1$, $R_2$, $R_3$, $R_4$ and $R_7$ are methyl.

12. A process for forming a membrane comprising the steps of:

forming a mixture comprising an at least partially sulfonated arylenedialkylidene polymer of claim 1 in a solvent;

forming a layer comprising said polymer; and evaporating said solvent from said layer.

* * * * *